United States Patent Office 3,784,713
Patented Jan. 8, 1974

3,784,713
MOISTURE BARRIER COATING COMPOSITION
Frank P. Colten, Dover, Del., and Morton Kaplan, Battle Creek, Mich., assignors to General Foods Corporation, White Plains, N.Y.
No Drawing. Filed Jan. 4, 1971, Ser. No. 103,863
Int. Cl. A23g 1/00, 3/00
U.S. Cl. 426—171
6 Claims

ABSTRACT OF THE DISCLOSURE

A chocolate coating with improved moisture barrier properties is obtained by the incorporation of a minor amount of an alkali or alkaline earth metal derivative of isolated soy protein into the composition.

BACKGROUND OF THE INVENTION

This invention relates to solid chocolate materials and chocolate coated products. More particularly, it relates to chocolate coatings and confectionery coatings suitable in the preparation of bars, candies, bakery products, icings, and the like.

The moisture loss of certain confectionary products during storage is a matter of common experience. Chocolate coated candies, cookies, cakes, doughnuts, and other bakery products with high moisture centers and fillings tend to change in appearance under certain conditions of storage. While the phenomenon of "bloom" is observed with many such confectionery and bakery products, the related phenomenon of loss of moisture from the centers of the products is perhaps more serious. Thus, high moisture candy centers such as cream fondant, marshmallow, and coconut covered with chocolate or imitation chocolate coatings may rapidly lose moisture in storage. The candy center becomes hard and the coating cracks and collapses. Similarly, chocolate coated bakery products such as cakes, doughnuts, and specialty items may quickly become stale due to the transmission of moisture through the coating resulting in a relatively short shelf life. Thus chocolate coated candies and bakery products with high moisture centers and fillings supplied to retailers in a fresh condition frequently take on an unpalatable appearance or quickly become stale due to moisture loss.

The taste and technical requirements of the chocolate industry preclude any substantial modifications of the chocolate compositions as currently employed. For instance, in the enrobing or dipping of confectionery and bakery items the process is very sensitive to the melting point and viscosity properties of the coating. Furthermore, foregin tastes must be avoided and the characteristic chocolate flavor must be preserved to the satisfaction of the consumer. Moreover, federal standards of identity limit the permissible ingredients for chocolate and chocolate coatings as well as for other food products.

The term "chocolate product" as employed in this application is intended to include the solid or semiplastic food prepared by finely grinding cacao nibs and compositions wherein this material is an essential ingredient. Thus, within the expression is included such material commonly known as "chocolate liquor," "chocolate," "chocolate coating," "bitter chocolate coating," "bittersweet chocolate," "bittersweet chocolate coating," "semi-sweet chocolate" or "semi-sweet chocolate coating" wherein the sweetening ingredient may be sucrose, dextrose, dried corn syrup and the like; and the chocolate liquor, milk solids, sweetened compositions commonly known as "milk chocolate," "sweet milk chocolate," "milk chocolate coating," "sweet milk chocolate coating," "skim milk chocolate," "buttermilk chocolate" and "mixed dairy product chocolates." Furthermore, compositions made from sweet chocolate or cocoa and fats other than cacao fat are intended by the generic term. In these latter compositions the caco fat is replaced entirely or in part by one or a mixture of two or more vegetable food oils or fats other than caco fat, which may be hardened or hydrogenated. Such coatings are employed primarily to obtain variations in the melting point and simulate melting properties of chocolate.

The chocolate and chocolate flavored compositions as described above may contain additives as spice, ground vanilla beans, any natural food flavoring oil, oleoresin or extract, vanillin, ethyl vanillin, or other artificial food flavoring, butter, milk fat, dried malted cereal extract, ground coffee, ground or whole nut meats, salt, and viscosity modifiers such as lecithin.

While packaging films are available which afford various degrees of moisture retention, severe limitations are noted where small candies and bakery products are concerned. Edible films are also marketed for the protection of meat products and nut meats against loss of water vapor. However, the probability of off flavors being introduced by the use of such edible films is a disadvantage which make edible films as a class not entirely suitable for application to candies and bakery products. At the present time it appears that chocolate or vegetable fat confectioners coatings with improved moisture barrier properties have not been available for use with high moisture candy centers and bakery products.

It is an object of the present invention to produce a chocolate coating having improved moisture barrier properties.

It is another object of the present invention to provide a process of treating chocolate for use in the preparation of confectionery coatings for products such as candy centers, cookies, biscuits, doughnuts, cakes and the like wherein moisture loss from the centers of such confectionery items is reduced.

A further obejct of the present invention is to provide an edible chocolate coating serving to stabilize the coated products against moisture loss and which coating does not vary essentially in composition or physical properties from conventional chocolate and confectionery coatings presently in commercial usage.

SUMMARY OF THE INVENTION

In accordance with the present invention it has been discovered that by the incorporation of minor amounts of an alkali or alkaline earth metal derivative of isolated soy protein within a chocolate product the tendency of moisture loss from edible confectionery of bakery products coated with such chocolate product is greatly reduced. Thus, it has unexpectedly been found that decreases in moisture transmission of about 30–60% or higher as compared with regular chocolate have been obtained.

While the physical and chemical theory underlying the surprising improvement is not entirely understood, it is postulated that the improvement occurs because of one or a combination of the actions listed below:

(1) An additive which acts as a wetting or emulsifying agent helps to spread the liquid fat more evenly over the solid particles of the composition during processing.

(2) Materials with moisture binding properties affect the transmission of water through the coating. This occurs because of the hydrophilic nature of the additive, or actual solution may occur at the molecular interfaces.

DETAILED DESCRIPTION OF THE INVENTION

The additive of this invention may be prepared by the convention prior art processes for isolating soy protein. Dehulled soy beans are subjected to oil extraction to remove a preponderance of the non-protein components. The protein, principally a mixture of amino acids commonly known as glycinin, is then rendered water-dispersible by treatment with an aqueous solution of an alkali or alkaline earth metal hydroxide, carbonate, phosphate or the like. The alkali or alkaline earth metal derivative of the isolated soy protein is subsequently recovered by evaporation or spray drying.

The preferred additive for the purposes of this invention is a sodium proteinate derived from isolated soy protein. This material is commercially available under the tradename "Promine-D," and generally contains at least 90% protein [calculated as nitrogen content X6.25] on a moisture free basis. The preferred level of addition of the sodium proteinate in the coating composition of this invention ranges from 0.25 to 4.0% by weight.

In the preparation of the chocolate coatings of this invention a solid chocolate of conventional commercial origin is melted and the sodium proteinate is added to the liquid in a molten state in the desired proportions with constant stirring. The mass is then tempered following the usual procedure. Such chocoate is available for the dipping of centers, or may be cast into molds for the production of chocolate products which are then supplied to candy, cookie and biscuit manufacturers.

Typical examples illustrating the persent invention follow. However, it must be observed that these examples are illustrative only.

EXAMPLE I

Milk chocolate with Promine D [sodium proteinate]

A mixture is formulated as below and mixed in the melanger for 15 minutes:

| | |
|---|---|
| Chocolate liquor | 3 lbs. |
| Roller whole milk powder | 4 lbs. 4 oz. |
| Mil-lait [1] | 4 oz. |
| Promine D [sodium proteinate] | 8 oz. |
| Granulated sugar | 12 lbs. 15 oz. |
| Cocoa butter | 2 lbs. |
| | 22 lbs. 15 oz. |

[1] Enzymatically treated whole milk powder.

Flavors are added at the beginning of the mix cycle:
7.10 gm. salt
7.10 gm. vanillin The melanger mix was then refined on the 5-roll refiners to give a fineness of .0011 inch. The refined dry mix was then added to a mixing kettle (Dopp pot) with 2 oz. lecithin and 1 lb. 15 oz. cocoa butter. Mixing time was 2 hours at 140° F. Coating was standardized to a final viscosity of 140° McMichael by the addition of 1 lbs. 8 oz. cocoa butter. Final formula is as follows:

| | Percent |
|---|---|
| Chocolate liquor | 11.65 |
| Roller whole milk powder | 16.50 |
| Mil-lait | 0.97 |
| Granulated sugar | 50.25 |
| Cocoa butter | 18.20 |
| Promine D | 1.94 |
| Lecithin | 0.49 |
| | 100.00 |

Flavors/100 lbs.:
28.40 gm. salt
28.40 gm. vanillin

EXAMPLE II

Milk chocolate without Promine D

A second batch of milk chocolate was formulated as in Example I, but the Promine D was omitted. Final formula is as follows:

| | Percent |
|---|---|
| Chocolate liquor | 11.97 |
| Roller whole milk powder | 16.96 |
| Mil-lait | 1.00 |
| Granulated sugar | 53.62 |
| Cocoa butter | 15.95 |
| Lecithin | 0.50 |
| | 100.00 |

Flavors/100 lbs.
28.40 gm. salt
28.40 gm. vanillin

The formulations of Examples 1 and 2 were prepared for the hand dipping of cream fondant and coconut centers, doughnuts and sponge cake as follows. Four pounds of the chocolate was melted at 120° F. in an aluminum pan. Melted material was stirred continuously by hand in a 70° F. room down to 79° F. (about 20 minutes) and then brought back up to 88° F. with stirring in a 95° F. room (about 15 minutes).

Pre-weighed cream fondant and coconut centers, doughnuts and sponge cake were each hand dipped in the tempered formulations of Examples 1 and 2. The hand dipped items were then placed on a cellophane covered tray and let stand overnight at 65° F., 50% relatvie humidity.

The moisture barrier properties of the coating containing the sodium proteinate (Example 1) and the control (Example 2) were evaluated according to the following procedure. Weighed samples of the coconut and cream fondant centers, doughnuts and sponge cake were placed in Petri dishes and sealed in a screw cap jar containing a suitable desiccant such as calcium chloride or calcium sulphate. These sealed jars were then stored at 75° F. Each sample was weighed on a weekly basis and the weight loss recorded. Having recorded the weight of each item before and after coating, and the percent moisture of each center immediately prior to the coating operation, the moisture transmitted from each center through the chocolate shell was calculated as the percent of the total available moisture lost from the center. Results after 16 weeks of storage time are recorded in Table 1.

TABLE 1.—PERCENT OF AVAILABLE MOISTURE TRANSMITTED

| | Center | | | | | | | |
|---|---|---|---|---|---|---|---|---|
| | Fondant | | Coconut | | Doughnut | | Sponge cake | |
| Coating | Ex. 1 | Ex. 2 | Ex. 1 | Ex. 2 | Ex. 1 | Ex. 2 | Ex. 1 | Ex. 2a |
| Storage time in weeks: | | | | | | | | |
| 1 | 1.3 | 3.0 | 0.6 | 0.9 | 6.9 | 13.0 | 7.8 | 17.1 |
| 2 | 2.3 | 6.0 | 1.2 | 1.8 | 13.6 | 27.5 | 15.0 | 34.0 |
| 3 | 3.0 | 7.5 | 2.0 | 2.9 | 20.5 | 42.0 | 22.5 | 50.5 |
| 4 | 3.9 | 9.0 | 2.7 | 3.9 | 26.4 | 51.0 | 31.0 | 66.0 |
| 8 | 6.8 | 15.0 | 5.7 | 7.6 | | | | |
| 12 | 8.7 | 21.0 | 8.0 | 11.1 | | | | |
| 16 | 10.6 | 27.1 | 10.4 | 14.4 | | | | |

As can be seen from the data of Table 1, the coating of Example 1 containing the sodium proteinate transmitted on the average from about 30–60% less moisture than the control coating of Example 2. Consequently, the fondant and coconut centers coated with the control coating of Example 2 exhibited a definite change in texture after 16 weeks of storage under test conditions, while the centers coated with the coating containing the sodium proteinate were still soft, moist and quite palatable. The same condition was found to exist with regard to the coated bakery products after 4 weeks of storage. These results indicate that the shelf life of confectionery and bakery products having a chocolate coating containing the sodium proteinate is approximately doubled as compared with such items having a regular chocolate coating.

While this invention has been particularly described with reference to chocolate or chocolate flavored coatings, it is equally applicable to other confectionery coatings based on cocoa butter and/or vegetable fat, sugar, flavorings, milk and the like.

What we claim is:

1. In a process of coating a confection or bakery product with a chocolate product coating, the improvement which comprises incorporating in said coating an alkali or alkaline earth metal derivative of isolated soy protein in an amount effective to retard moisture loss from said confection or said bakery product.

2. The process of claim 1 wherein said isolated soy protein derivative is a sodium proteinate.

3. In a process for coating a confection or bakery product with a chocolate product coating, the improvement which comprises incorporating in said coating from 0.25 to 4.0% by weight of a sodium proteinate derived from isolated soy protein, said sodium proteinate effective to retard moisture loss from said confection or said bakery product.

4. A composition adapted for use as a coating for confections and bakery products comprising a chocolate product and an alkali or alkaline earth metal derivative of isolated soy protein, said soy protein derivative present in an amount effective to retard moisture loss from confections and bakery products coated with said composition.

5. The composition of claim 4 wherein said isolated soy protein derivative is present at a level of from 0.25 to 4.0% by weight.

6. The composition of claim 5 wherein said isolated soy protein derivative is a sodium proteinate.

References Cited

UNITED STATES PATENTS

| | | | |
|---|---|---|---|
| 3,323,922 | 6/1967 | Durst | 99—166 |
| 3,092,500 | 6/1963 | Keil | 99—166 |
| 3,009,812 | 11/1961 | Ganz | 99—139 |
| 3,332,784 | 7/1967 | Ellis | 99—139 |

S. LEON BASHORE, Primary Examiner

F. FREI, Assistant Examiner

U.S. Cl. X.R.

426—306